United States Patent [19]
Alleai

[11] Patent Number: 6,032,552
[45] Date of Patent: Mar. 7, 2000

[54] VIBRATION CONTROL BY CONFINEMENT OF VIBRATION ENERGY

[75] Inventor: Daryoush Alleai, Excelsior, Minn.

[73] Assignee: Quality Research Development & Consulting, Inc., Excelsior, Minn.

[21] Appl. No.: 08/850,285

[22] Filed: May 5, 1997

Related U.S. Application Data

[63] Continuation-in-part of application No. 08/512,070, Aug. 7, 1995, abandoned.

[51] Int. Cl.⁷ ................................................. F16F 15/10
[52] U.S. Cl. ............................................. 74/574; 74/572
[58] Field of Search ...................................... 74/572–574

[56] References Cited

U.S. PATENT DOCUMENTS

| | | | |
|---|---|---|---|
| 3,054,284 | 9/1962 | Ciringione et al. | 73/67.2 |
| 3,322,474 | 5/1967 | Destival | 308/26 |
| 3,568,962 | 3/1971 | Janssen | 248/15 |
| 3,693,402 | 9/1972 | Jones | 73/11 |
| 3,756,672 | 9/1973 | Hibner | 308/26 |
| 3,866,480 | 2/1975 | Elliston | 74/87 |
| 4,105,265 | 8/1978 | Stahlecker | 308/158 |
| 4,150,588 | 4/1979 | Brewer | 74/574 |
| 4,326,158 | 4/1982 | Helgesen | 74/572 X |
| 4,489,991 | 12/1984 | Delam | 384/428 |
| 4,776,541 | 10/1988 | Maynard | 74/572 |
| 4,872,767 | 10/1989 | Knapp | 384/99 |
| 4,922,869 | 5/1990 | Kadomukai et al. | 123/192 R |
| 5,056,487 | 10/1991 | Yamakado et al. | 123/436 |
| 5,185,543 | 2/1993 | Tebbe | 74/574 X |
| 5,303,681 | 4/1994 | Crofts | 74/547 X |
| 5,553,514 | 9/1996 | Walkowc | 74/574 |

OTHER PUBLICATIONS

Triantafyllou, "Frequency Coalescence and Mode Localization Phenomena: A Geometric Theory" (1991) Journal of Sound and Vibration, (pp. 485–500).

Bouzit, "Localization of Vibration in Disordered Multi–span Beams with Damping" (1993) ASME, (pp. 43–57).

Allaei, "Vibration and Noise Optimization by 'Smart' Design" (1994) Third International Congress on Air–and Structure–Borne Sound and Vibration, (pp. 771–778).

Yigit, A. S. and S. Choura, "Vibration Confinement in Flexible Structures Via Alteration of Mode Shapes by Using Feedback", Journal of Sound and Vibration (1995), vol. 179(4), pp. 553–567.

Chen, Pei–Tai and J. H. Ginsberg, "On the Relationship Between Veering of Eigenvalue Loci and Parameter Sensitivity of Eigenfunctions", Journal of Vibration and Acoustics (Apr. 1992), vol. 114, pp. 141–148.

Photiadis, Douglas M., "Anderson localization of one–dimensional wave propagation on a fluid–loaded plate", J. Acoust. Soc. Am. (Feb. 1992), vol. 91(2), pp. 771–780.

Shih, T. S. and D. Allaei, "On the Free Vibration Characteristics of Annular Plates with Ring–Type Elastic Attachments", Journal of Sound and Vibration (1990), vol. 140 (2), pp. 239–257.

Ibrahim, R.A., "Structural dynamics with parameter uncertainties", Appl. Mech. Rev. (Mar. 1987), vol. 40 (3), pp. 309–328.

Bendiksen, Oddvar O., "Mode Localization Phenomena in Large Space Structures", AIAA Journal (1986).

Hodges, C. H. and J. Woodhouse, "Vibration isolation from irregularity in a nearly periodic structure: Theory and measurements", J. Acoust. Soc. Am. (Sep. 1983), vol. 74 (3), pp. 894–905.

*Primary Examiner*—Vinh T. Luong
*Attorney, Agent, or Firm*—Merchant & Gould P.C.

[57] ABSTRACT

Undesirable vibrations are controlled in a mechanical structure by confining the vibrations to one or more specified areas of the structure. Vibration confinement is achieved using a confinement device which effectively applies both translational and torsional forces to the structure. The strength of the translational and torsional forces, and the position of the confinement device are chosen by the designer to select a vibrational energy confinement region. Judicious selection of the confinement a region permits the structure to avoid the transfer of vibrational energy to particularly sensitive portions of the structure.

12 Claims, 16 Drawing Sheets

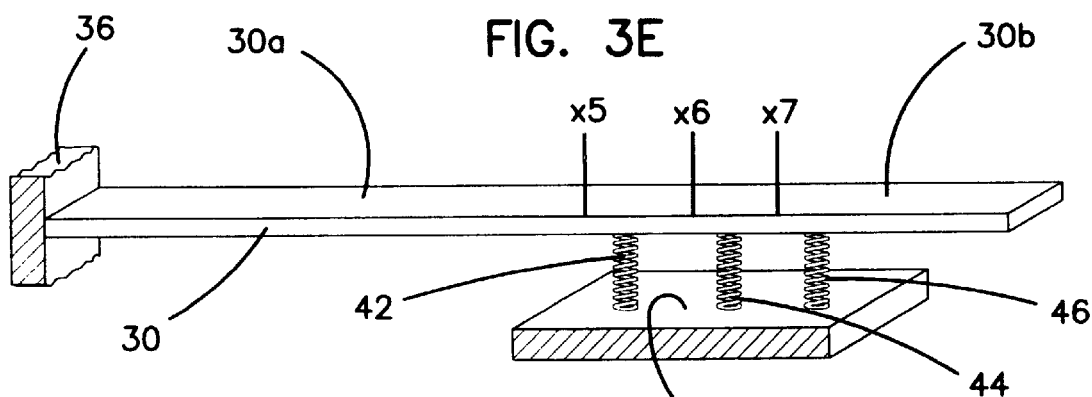
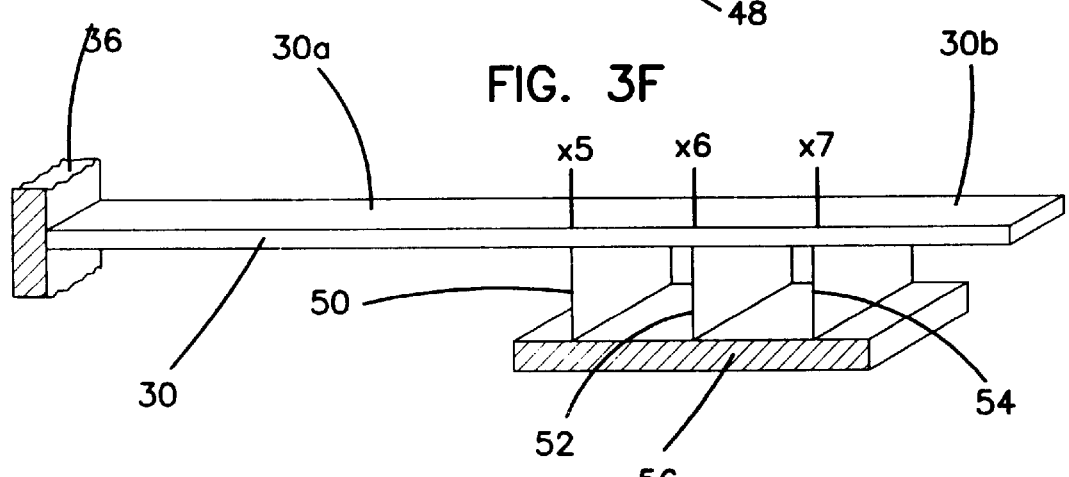
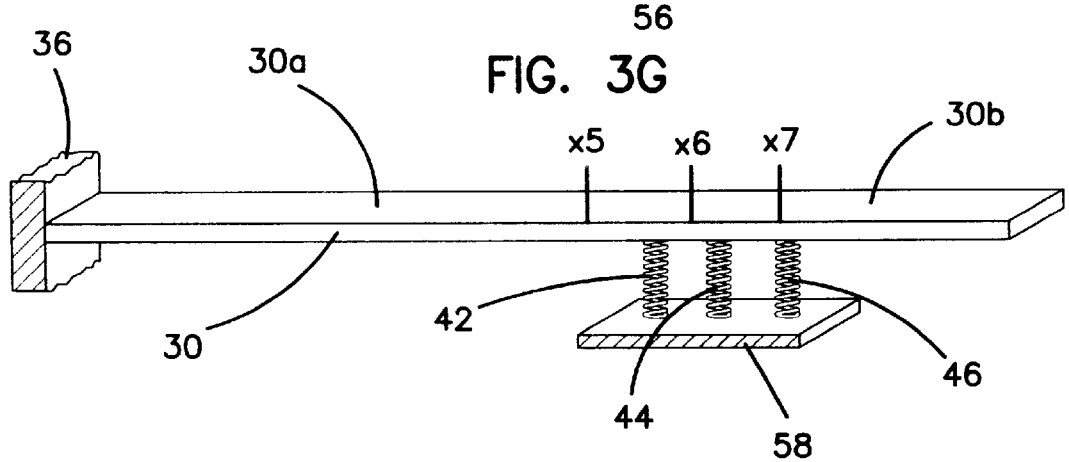
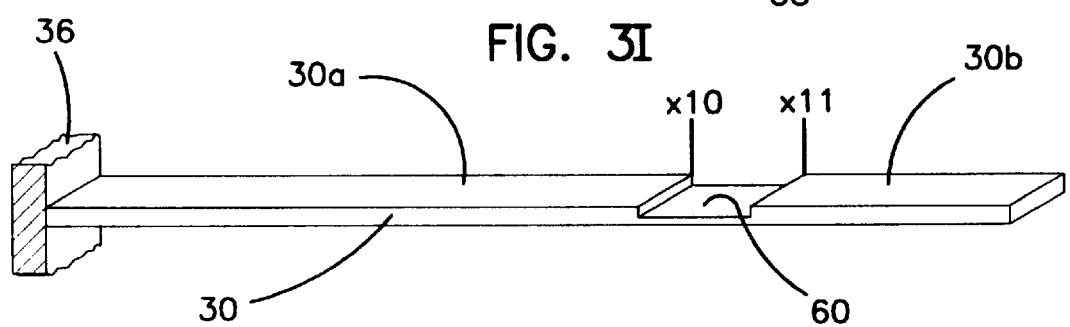

Mode 1: 31.3 Hz        Mode 2: 97.2 Hz        Mode 3: 116.5 Hz

VIBRATION CONTROL BY CONFINEMENT OF VIBRATION ENERGY

CROSS-REFERENCE TO RELATED APPLICATION

This is a continuation-in-part of application Ser. No. 08/512,070, filed Aug. 7, 1995 now abandonded.

STATEMENT AS TO RIGHTS OF INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of (Contract No. DAAH01-94C-R001) awarded by DARPA (DOD) Defense Small Business Innovation Research Program.

BACKGROUND

1. Field of the Invention

The present invention is directed generally to the control of vibration in structures, and more particularly to the confinement of vibrational energy to selected portions of structures.

2. Description of Related Art

The suppression or control of vibration has an increasing importance in the design, manufacture, operation, maintenance, precision, and safety of structures and machinery. Engineering systems are subjected to numerous disturbances from either internal or external sources of vibration. Conventional methods for reducing the effect of vibration take several forms, and may be classified into the three general categories, viz. 1) isolation, e.g. the use of rubber shock mounts, 2) absorption (redirection), and 3) suppression (dissipation).

Conventional active vibration control methods utilize sensors, signal processing, actuators, and power sources to produce forces or strains in the system that counteract the vibration or to effectively increase the dissipation in a system.

"Smart" materials and structures have extended the range of active, as well as passive, vibration control mechanisms, where the term "smart" refers to materials or structures that respond to environmental or operational conditions by altering their material, geometric, or operational properties. Such a response may be triggered both with and without additional control mechanisms (such as a sensory and feed-back loop). Examples of smart materials include piezoceramics, shape memory alloys, electrostrictive and magnetostrictive materials, rheological and magnetological fluids.

Although active control methods have been shown to be effective in some limited applications, their drawbacks are emphasized by a reliance on computationally complex control algorithms, high numbers of sensors and high actuator power requirements, and continuous monitoring and feedback or feed-forward mechanisms. These drawbacks have demonstrated the need for an alternative or additional approach to vibration control. Additionally, semi-active control techniques reduce only the requirement on continuous actuation but their development and implementation has not yet progressed as far as fully active control or passive control.

It is important for the economic operation and practical implementation of active and passive vibration control technologies that the number of controlled regions and controlling components be reduced to achieve the vibration control objectives more effectively and efficiently.

There are common features between the above methods. First, they are designed to control vibrations in a reactive manner. All of these methods assume (or necessitate) that excessive vibration energy is present in all regions of a structure which are to be controlled. The vibration control mechanism then acts upon this vibration energy to suppress vibration. Second, these methods are all designed to be most effective in a certain frequency range. Isolators, absorbers, and dampers, whether active or passive, must be tuned to a specific frequency range of interest. Active cancellation methods are also limited in their effective frequency range by the speed of signal processing and activator response time requirements. Third, these methods are designed without regard to the distribution of vibrational energy throughout the system.

Therefore, there is a need for a method of controlling vibrational energy in a system which is proactively designed into the system, and which takes account of total energy distribution throughout the system. There is also a need to expand the frequency range over which vibrational energy is controlled. Further, economic considerations drive a need to reduce the number of controlled regions and controlling components and to reduce the complexity of active vibration control systems.

SUMMARY OF THE INVENTION

Generally, the present invention relates to a method of controlling the distribution of vibrational energy throughout a structure, a structural component, or a machine, hereafter referred to as the "system". The method, known as vibration control by confinement (VCC), includes selecting a confinement region in a vibrating member in which the vibrational energy is to be confined. A device for confining the vibrational energy is positioned on the vibrating member at a determined position. The vibration confinement device has effective translational stiffnesses, effective torsional stiffnesses and an effective mass which result in the application of translational, torsional and inertial forces to the system. These translational, torsional and inertial forces result in confining vibrational energy to the vibration confinement region. The extent of the vibration confinement region is determined by the location at which the effective translational, torsional and inertial forces are applied to the system.

The VCC approach to vibration control targets the root cause of vibration-related problems, the flow of vibration energy within a system. By controlling the flow of vibration energy, several advantages over conventional vibration control approaches may be realized. The VCC approach allows the reduction of vibration levels to a greater degree than either conventional passive or active control methods, overcomes frequency range limitations of conventional control methods, reduces system vibration response for all types of disturbances, and brings selected regions of a system to acceptable vibration levels more quickly.

Advantages of implementing vibrational control by confinement (VCC) include confining undesired vibrations to specified regions of the structure, thereby achieving a higher level of vibration suppression throughout the remaining regions or components of the structure. Additionally, VCC permits better optimization of vibration control systems to make them more economically attractive.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 3B–3I illustrate various embodiments of vibration confinement devices;

Figure 1:
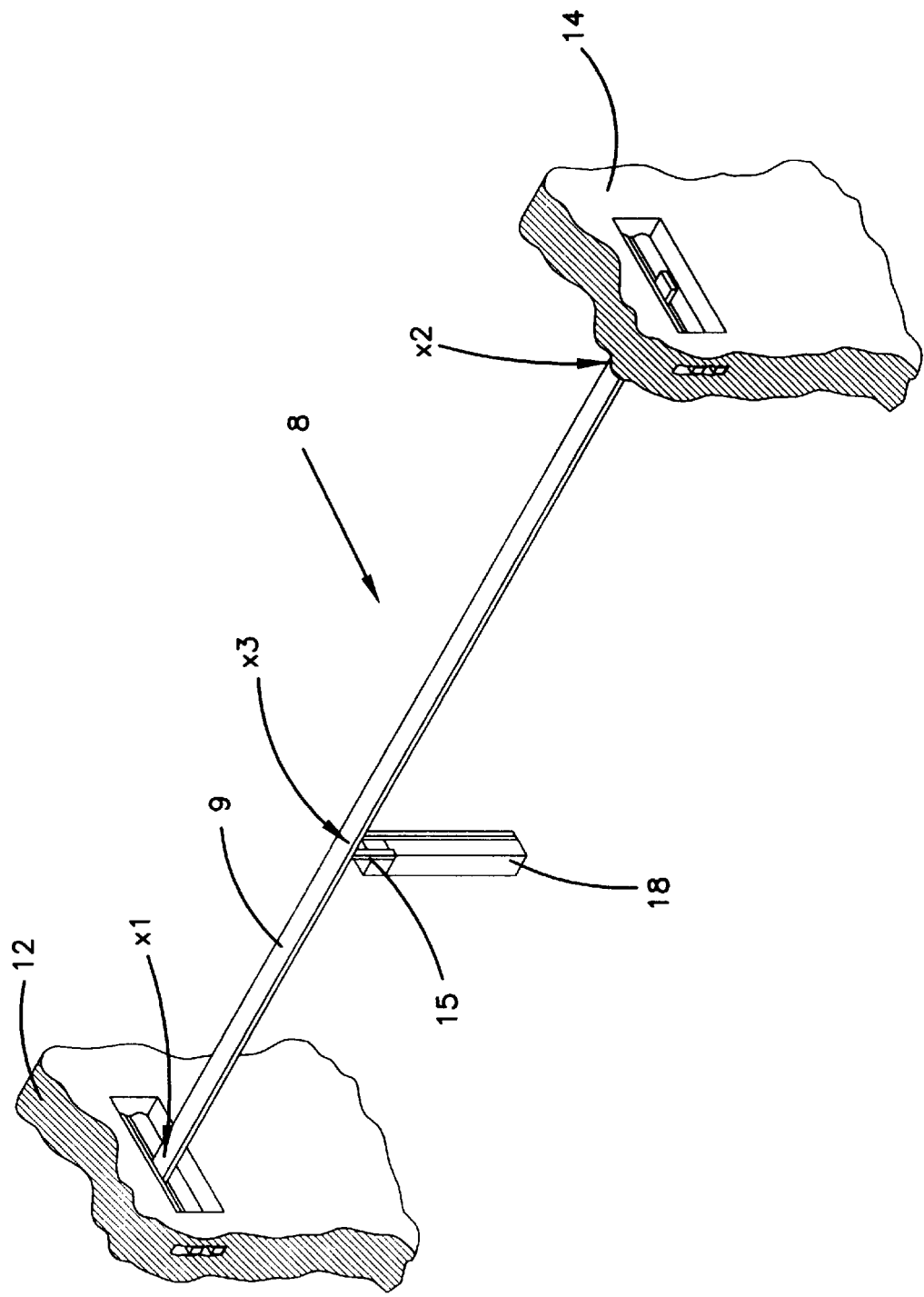
FIG. 1 is a view of a beam structure with a vibration confinement device for confining vibrational energy according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is applicable to the control of vibrations in mechanical structures, machines and systems, and is concerned with confining vibrational energy to selected portions of the structure, machine or system. This approach may allow for the compensation of the deficiencies of prior art approaches and, therefore, may improve the effectiveness of the vibration control systems and reduce their implementation and operational costs.

The present invention provides a method for controlling the distribution of vibrational energy throughout mechanical structures, including rod-, beam-, shaft-, plate-, and shell-type structures, or various combinations thereof. The vibrational energy is typically confined by an adjustable vibration confinement device which prevents the transmission of vibrational energy from a first region on one side of the device to a second region on a second side of the device. The location and stiffness of the confinement device may be set to control the extent, severity, and effective frequency range of the vibration confinement. Three parameters, namely the effective location of the confinement device, its translational stiffness and its torsional stiffness are chosen so as to control the confinement of vibrational energy throughout the selected areas of a structure.

The confinement device may be implemented, for example, with springs. Shape memory springs and wires, air springs, or other stiffness controlled springs may be used to change the stiffness of the vibration confinement device.

Embodiments of the invention may find utility in a number of structures and machines, including buildings, bridges, space structures, automobiles, trucks, tractors, aircraft, seacraft, telescopes, microscopes, telescopes, marine craft, data reading and writing devices, electronic enclosures, imaging devices, robots, and other machinery. This list is not intended to be limiting, but merely to be illustrative of the wide range of applicability of the invention.

Introductory Theory

The dynamic response of many non-gyroscopic engineering systems are governed by Eq. (1), which relates the displacement $u(x,y,z,t)$ from the equilibrium position of a structure defined in space domain D and subjected to the applied and disturbance force distribution $f_a(x,y,z,t)$ and $f_d(x,y,z,t)$, respectively, where x, y, and z are orthogonal directions and t is time.

$$M\ddot{u}(x,y,z,t)+2\zeta[ML]^{1/2}\dot{u}(x,y,z,t)+Lu(x,y,z,t)=f_a(x,y,z,t)+f_d(x,y,z,t)B[u(x,y,z,t)]=0 \quad (1)$$

M is a positive function describing the mass density, $\zeta$ is the damping factor, and L is a linear time-invariant, symmetric, non-negative differential operator representing the stiffness distribution of the structure. $B[u(x,y,z,t)]$ is a set of linear differential operators characterizing the boundary conditions.

In the field of passive and active vibration control, the distributed applied force, $f_a(x,y,z,t)$, includes forces dependent upon the displacement, velocity, and acceleration fields. This combination of applied forces has been used to suppress and decay vibration response in the time domain. The velocity and acceleration fields are the first and second order time derivatives, respectively, of the displacement field.

An example of a displacement-dependent applied force is an elastic (spring-type) support whose reactive force is proportional to the relative displacement of its two ends. Elastic supports are used to couple or isolate two parts of a system. An attached mass may also be used to block (or disturb) the path for the flow of vibration energy throughout the structure. Note that the application of an elastic support also results in the addition of uses to the system.

All three types of forces, those dependent upon the displacement, velocity or acceleration may be employed either passively or actively. In the case of active application, the applied force is referred to as an actuating force. The magnitude of the actuating force is controlled by a feedback or a feed-forward loop which may include gain and a measure of displacement or its time derivatives.

In spite of the recent advances in the fields of passive and active vibration control, little attention has been given to the case when the applied or actuating force is dependent upon spatial partial derivatives of the displacement. The proper selection of the force, $f_a(x,y,z,t)$, including spatial partial derivatives of the displacement, is an important tool for inducing vibration confinement.

It has been demonstrated by the inventor that the application of forces that can depend on the displacement, velocity, and/or acceleration fields, and their spatial partial derivatives, forms an effective approach for inducing vibration confinement in structures. The VCC approach may also simultaneously confine and suppress the vibrational energy present in the structure.

In order to induce confinement, the force applied to the structure should be related to the displacement field and inertia term via the linear operators shown by Eq. (2).

$$f_a(x, y, z, t) = L_a[u(x, y, z, t)] + M_a\left[\frac{\partial^2 u(x, y, z, t)}{\partial t^2}\right] \quad (2)$$

where $L_a$ and $M_a$ are linear spatial differential operators. When selecting the applied force for a specific application, these linear operators are multiplied by proportionality constants that control the rate of spatial decay, the extent of confinement (the size of the confinement region), and severity of confinement (the ratio of maximum response in the confined region to maximum response in the non-confined region). These constants can be implemented passively or actively.

In illustration, when confining translational, or flexural, vibrations in a beam, the linear operators are given by:

$$L = EI\frac{\partial^4}{\partial x^4}, M = \rho A \quad (3a)$$

$$L_a = \alpha_3 \cdot \frac{\partial^3}{\partial x^3} + \alpha_2 \cdot \frac{\partial^2}{\partial x^2} + \alpha_1 \cdot \frac{\partial}{\partial x} + \alpha_0, M_a = \beta_0 \quad (3b)$$

where $u(x,y,z,t)$ from Eq. 1 only manifests displacement as a function of x; the displacement has essentially no y or z dependence. The displacement is normal to the beam in a transverse direction. $\rho$ is the mass density of the beam, A is its cross-sectional area, I is its area moment of inertia, and E is the modulus of elasticity (Young's modulus). The proportionality constants are $\alpha_3, \alpha_2, \alpha_1, \alpha_0$, and $\beta_0$.

Other relationships require consideration when confining other types of vibration or when confining vibration in other types of structure. Other types of vibration include longitudinal (axial) vibration along a beam, and torsional vibration of a beam. Vibration in other structures includes out-of-plane and in-plane vibrations of a plate, and out-of-surface and in-surface vibrations in a shell-type element.

This approach for confining vibrations in flexible structures includes converting the extended (non-confined) mode shapes into exponentially decaying functions of the spatial coordinates by an appropriate selection of the applied or actuating force, $f_a(x,y,z,t)$, in Eqs. (1) and (2). Furthermore, it is possible to select the feedback forces so that the spatial confinement of vibrational energy occurs while the energy also decays in time. The latter can be achieved by including a velocity dependent term in the set of applied forces.

The applied forces may be used to induce confinement for the following reasons. In any real engineering structure, vibrational energy propagates throughout the structure via what is referred to as Degrees-of-Freedom (DoF). Every structure has a large number of DoF which are defined as the displacement and its derivatives of the particles forming the structure. Based on accepted engineering practices, the displacement and its first or second order derivatives are usually assigned as the DoF used in modeling and analysis. For example, in the case of the bending vibration of a beam, the DoF are assumed to be displacement and slope determined at points along the beam. When these DoF are suppressed, i.e. when displacement and its first order spatial derivative are suppressed, vibrational energy does not pass the point of suppression, resulting in vibrationally decoupled substructures on either side of the vibration confinement device, and the confinement of vibrational energy to one or other of the substructures.

Vibration confinement is illustrated in FIG. 1 for a structure 8 having a beam 10. The beam 10 is supported between first and second fixed supports 12 and 14. The first and second supports 12 and 14 define the boundary conditions of the beam's vibrations. The supports 12 and 14 do not permit translation of the beam 10 at the supported positions x1 and x2 respectively. This boundary condition may be stated mathematically as $u(x1)=u(x2)=0$, where $u(x)$ is the translation of the beam from an equilibrium position, at a point x along the beam. If the supports 12 and 14 permit rotation of the beam at the supported points, then the boundary conditions also include the conditions that $\delta u(x1)/\delta x$ and $\delta u(x2)/\delta x$ are not constrained. A blade-type vibration confinement device 15 is located at a position x3 on the beam 10. One end of the blade-type device 15 is fixed to the beam 10 and the other end is fixed to the confinement device support 18. The blade-type device 15 provides vibration confinement in the beam 10 by restraining the value of $u(x3)$ through stretching and compression (translational stiffness) of the blade-type device 15, and the value of $\delta u(x3)/\delta x$ through the resistance of the blade-type device to bending (torsional stiffness). It is understood that vibration confinement is not restricted to situations having the boundary conditions as presented in this example.

Figure 2A:
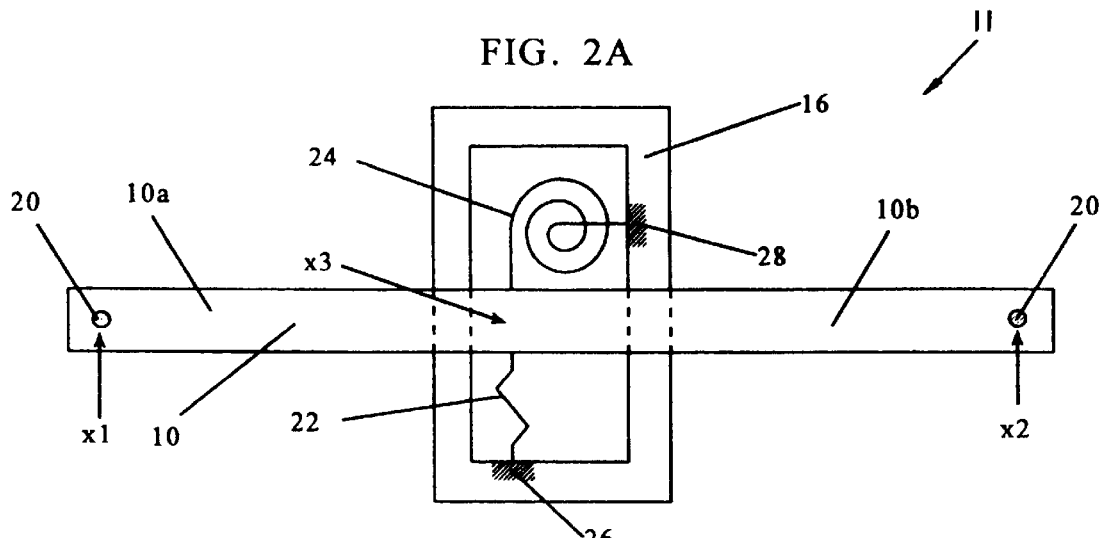
FIG. 2A is a schematic view of a beam structure having a generalized vibration confinement device.

Passive vibration confinement is further described with reference to FIGS. 2A to 2F. FIG. 2A illustrates a schematic view of a beam structure 11 similar to that shown in FIG. 1. The beam 10 is supported at either end with pins 20 which permit no translation of the beam at the pins but do permit rotation of the beam at those points. The translational and torsional stiffnesses of the vibration confinement device 15 are respectively represented by an effective translational spring 22 and an effective torsional spring 24, each located at the position x3 on the beam 10. The effective translational and torsional springs 22 and 24 are illustrated as being fixed to rigid points 26 and 28, respectively. The effective translational and torsional springs 22 and 24 represent the translational and torsional stiffness of any type of vibration confinement device, and are not restricted to the blade-type device 15 shown in FIG. 1. The effective translational spring 22 exerts a translational force, F, in a direction perpendicular to the axis of the beam 10. The effective torsional spring 24 exerts a bending moment, $M_b$, on the beam 10 at position x3. Thus, the translational and torsional springs 22 and 24 exert the force and moment described as follows:

$$F = Ku(x, t), \quad M_b = K_1 \times \frac{\delta u(x, t)}{\delta x} \qquad (3)$$

where u(x,t) is the transverse displacement of the beam as a functional position along the beam, K is the effective translational spring constant of the effective translational spring 22, and $K_t$ is the effective torsional spring constant of the effective torsional spring 24.

Figure 2B:
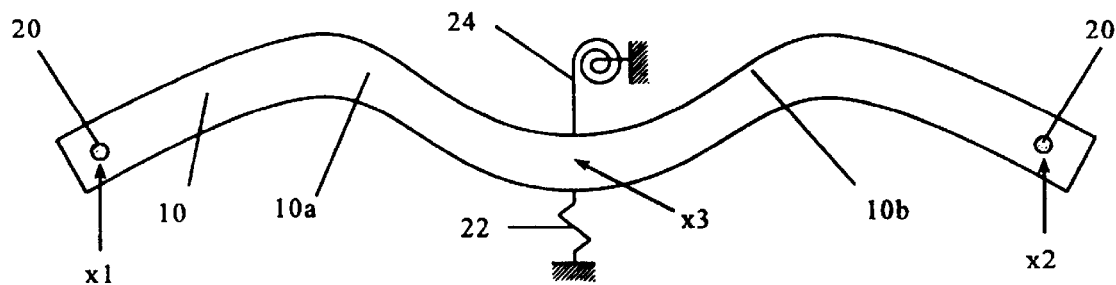
FIGS. 2B–2F illustrate vibrational responses of a beam structure under different vibration confinement device characteristics.
Figure 2C:
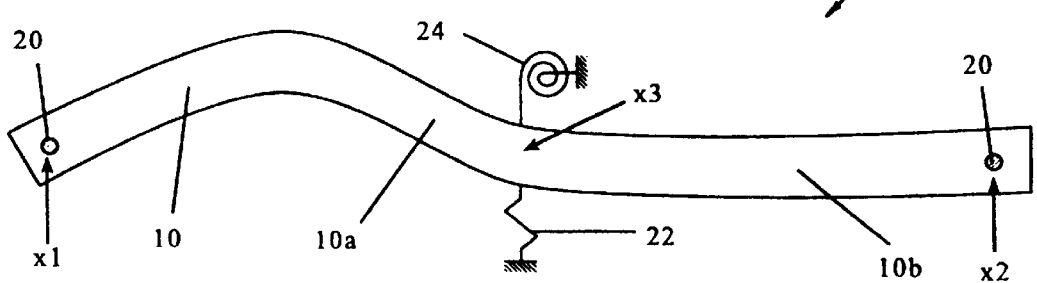

In a limiting case, illustrated in FIGS. 2B and 2C, the effective spring constants K and $K_t$ have values that are very large relative to the stiffness of the beam 10. FIG. 2B represents the modal response of the beam 10. The effective translational and torsional springs 22 and 24 are centrally located on the beam 10 at position x3. In this case, the two DoF, translation and bending, at position x3 are suppressed, and so propagation of vibrational energy between the left span 10a and the right span 10b of the beam 10 is suppressed. Thus, the beam 10 is effectively partitioned into two independent, decoupled, or vibrating substructures. Each of these decoupled substructures has its own independent set of vibrational modes, including a set of natural frequencies and a set of mode shapes. Thus, if the left substructure 10a were to be vibrated, the right substructure 10b would not receive any of the vibrational energy from substructure 10a, and the vibration is confined to a vibration confinement region to the left side of the beam 10, as is shown in FIG. 2C, which illustrates the forced response of the beam 10.

Figure 2D:
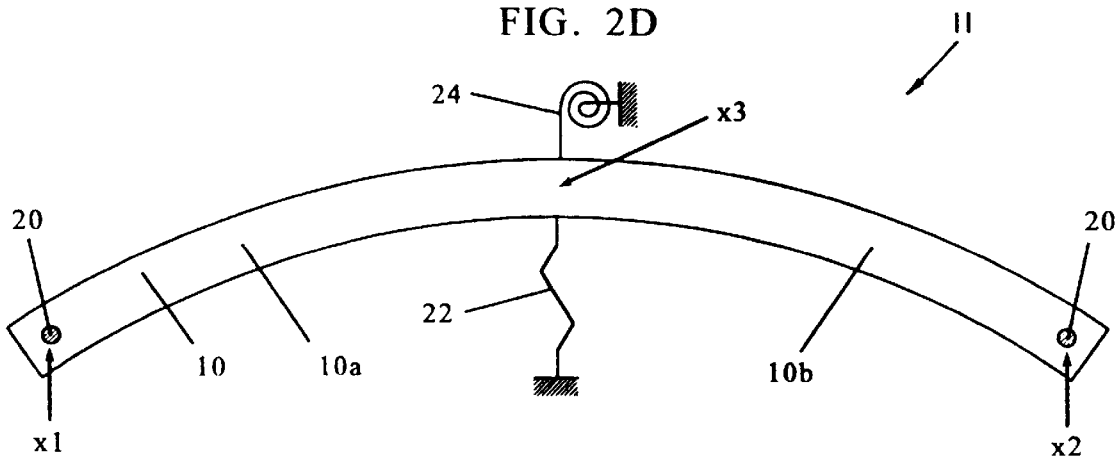

In the second embodiment, illustrated in FIG. 2D, the effective translational and torsional spring constants, K and $K_t$, are small relative to the stiffness of the beam 10. Here, there is little confinement of vibrational energy to one side of the beam 10 because the degrees of freedom at position x3 have not been suppressed. Thus, vibrational energy may easily be transferred to the left substructure 10a to the right substructure 10b.

Figure 2E:
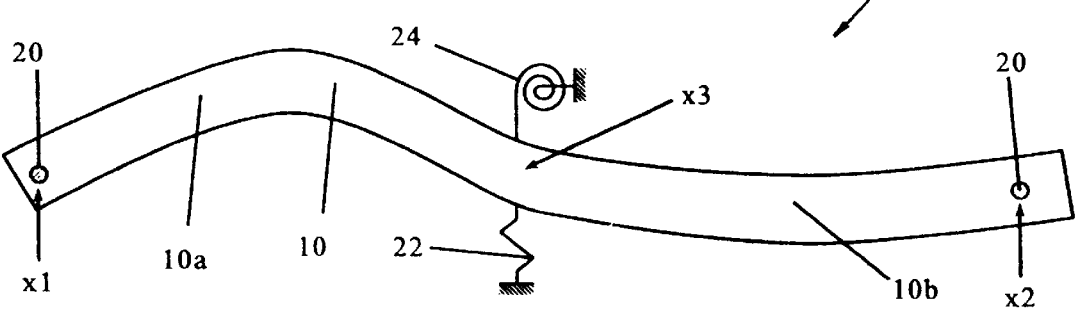

FIG. 2E illustrates an embodiment in which the effective translational and torsional spring constants, K and $K_t$, have values somewhere in between the values of the embodiments in FIGS. 2B and 2D. Thus, when the left substructure 10a is vibrated, some vibrational energy is transmitted through to the right substructure 10b. This contrasts with FIG. 2C where no vibrational energy is transmitted from the left substructure 10a to the right substructure 10b.

Figure 2F:
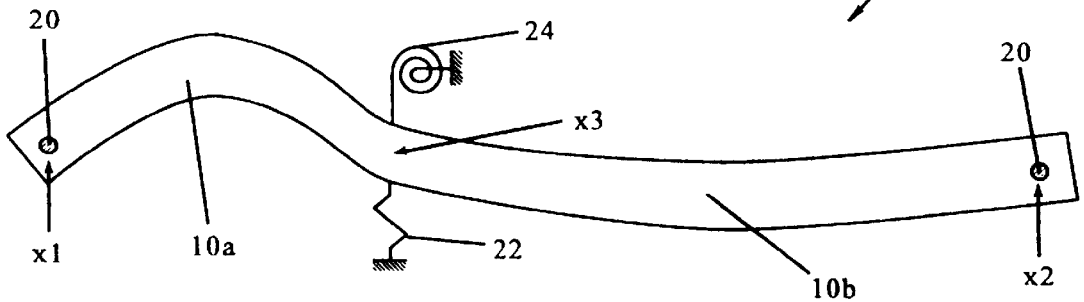

The vibration confinement device need not be positioned centrally along the beam 10. FIG. 2F illustrates the case where vibration confinement has been located in the left half of the beam 10 so that the left substructure 10a is shorter than substructure 10b.

The different conditions illustrated in FIGS. 2B to 2F show that the confinement of vibrational energy to a selected portion of a structure may be controlled by selective positioning of the vibrational confinement device, and by the selection of effective translational and effective torsional spring constants. These three parameters are of primary importance when designing a system using this embodiment of vibration control by confinement.

Figure 3A:
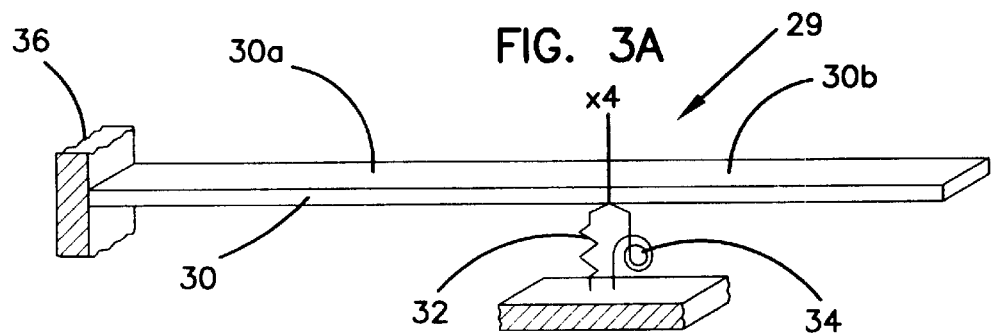
FIG. 3A illustrates a schematic view of a cantilevered beam with a generalized vibration confinement device according to an embodiment of the present invention.
Figure 3B:
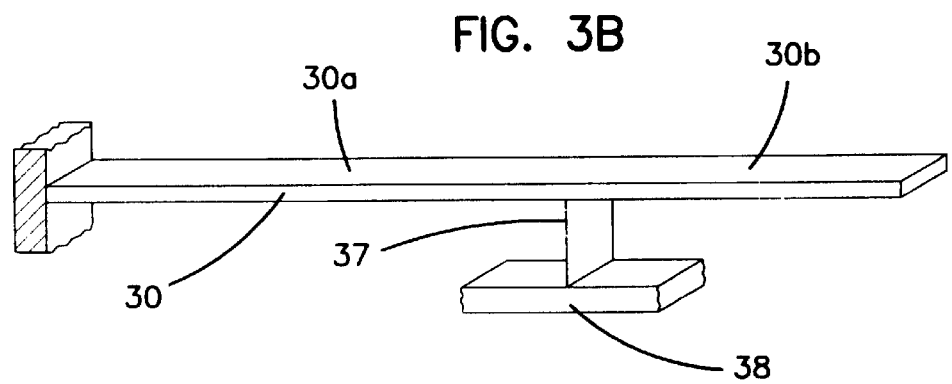

FIGS. 3A to 3I illustrate a number of embodiments where vibration confinement is applied to a cantilevered beam 30. FIG. 3A illustrates a generalized structure 29, in which the beam 30 is attached rigidly at one end to a fixed support 36. Vibration confinement is provided by the application of translational and torsional forces by an effective translational spring 32 and an effective torsional spring 34. The effective translational and torsional springs 32 and 34 are connected to the beam 30 at point x4. The portion of the beam 30 between the effective springs 32 and 34 and the support 36 is referred as the left substructure 30a and the portion of beam 30 to the right of point x4 is referred to as the right substructure 30b. In FIG. 3B, vibration confinement is provided by a blade-type device 37. The blade-type device 37 is rigidly attached to the lower surface of the beam 30 and to an upper surface of a rigid support 38, so that translational spring forces are provided in a direction perpendicular to the long axis of the beam 30 and torsional forces are provided by any bending of the blade-type device 37.

Figure 3C:
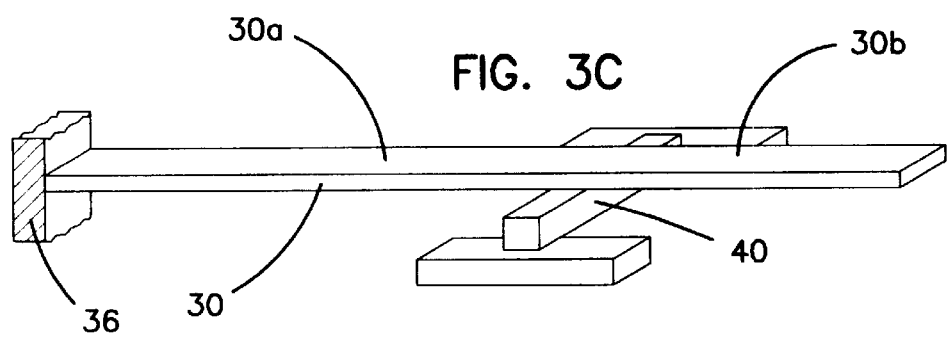
Figure 3D:
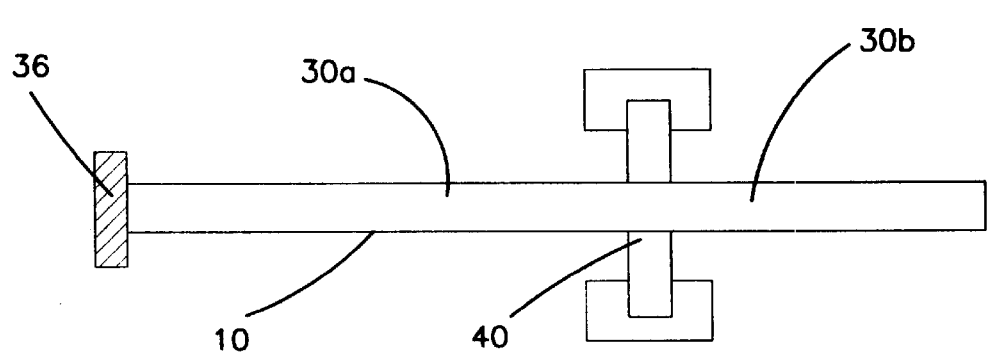

FIGS. 3C and 3D illustrate another approach to providing vibration confinement. In this case, vibration confinement is provided by a beam support 40 rigidly attached to the beam 30 perpendicular to the longitudinal axis of the beam 30. The beam support 40 is rigid relative to the beam 10. Here, the translational stiffness, K is represented by the bending stiffness of the beam support 40 and the torsional stiffness $K_t$ is provided by the torsional, or twisting, stiffness of the beam support 40. FIG. 3C shows a schematic perspective view, and FIG. 3D illustrates a plan view.

Vibration confinement may be provided by a number of translational springs, operating in a manner so as to provide a torsional force. An embodiment which includes this approach is illustrated in FIG. 3E, where three longitudinal springs 42, 44, and 46 are rigidly attached to the lower surface of the beam 30. The far ends of the springs 42, 44, and 46 are rigidly attached to a rigid support member 48. The applied force may be represented as:

$$F_a(x, t) = \sum_{i=5}^{7} K_i u(x_i, t)\delta(x - x_i) \qquad (4)$$

where x5 to x7 are the locations where the springs 42, 44, and 46 are attached to the beam 30. Each spring has its own associated spring constant $K_5$, $K_6$, and $K_7$, respectively. The delta function indicates that spring forces are applied only at positions x5–x7 along the beam 30. The total force $F_a$ is a combination of the three individually applied spring forces.

The application of more than one translational force at positions offset along the beam 30 results in the application of a bending moment to the beam 30. In this embodiment, the combined effect of the three springs 42, 44, and 46 is to provide a torsional force on the beam at a point between the outer springs 42 and 46. Although the springs 42, 44, and 46 are shown as coiled springs, it will be appreciated that is understood that they need not be coil springs, and several other types of spring may also be used. For example, other types of simple mechanical spring may be used, such as leaf springs, elastomeric springs, Belleville (disk) springs and torsion bars. Additionally, other types of spring may be employed, such as air-cushioned springs, magnetic springs, and shape memory alloy (SMA) springs. The spring used may have adjustable translational and torsional spring constants.

Another embodiment is illustrated in FIG. 3F in which blade-type elements 50, 52, and 54, each rigidly attached to a rigid support 56, are employed for confining vibration in the beam 30. Like the embodiment illustrated in FIG. 3E, the use of three blade-type elements 50, 52, and 54 results also in the application of a bending moment, and therefore, the combination of blade-type elements 50, 52, and 54 provides an effective torsional force to the beam 30.

Another embodiment is illustrated in FIG. 3G where three translational springs 42, 44, and 46 are attached to an elastic patch 58. The total force, $F_a$, applied to the beam 30 in this embodiment may be represented by:

$$F_a(x, t) = \sum_{i=5}^{7} K_i [u(x_i, t) - u_p(x_i, t)] \delta(x - x_i) \quad (5)$$

Here, $u_p(x_i,t)$ represents the displacement of the elastic patch 58 at the point $x_i$. The design parameters which a designer may choose for this embodiment includes the spring constants for the three springs 42, 44, and 46, and the geometry and material properties of the patch 58. The bending stiffness of the patch 58 also affects the effective translational spring constant of the vibration confinement device.

Figure 3H:
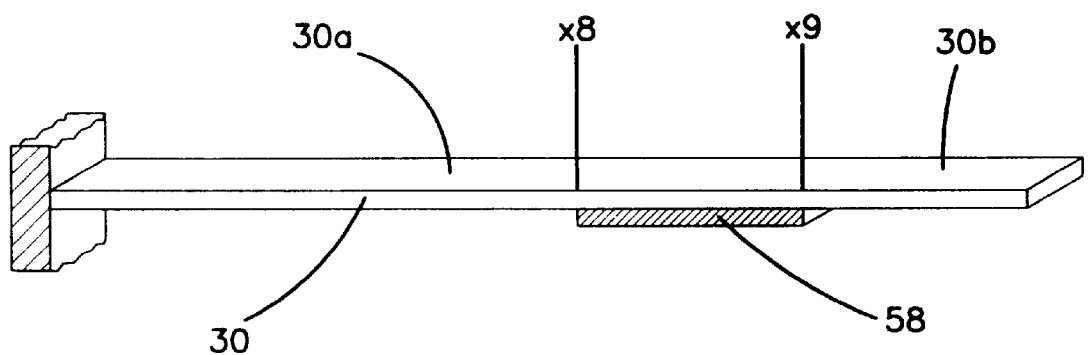

In another embodiment, illustrated in FIG. 3H, the patch 58 is bonded directly to the beam 30, and extends along the beam between points x8 and x9. The force applied to the beam 30 by the bonded patch 58 may be expressed as:

$$F_a(x, t) = \left\{ \alpha_2 \frac{\partial^2 u_p(x, t)}{\partial x^2} + \alpha_1 \frac{\partial u_p(x, t)}{\partial x} + \alpha_0 u_p(x, t) + \beta_0 \frac{\partial^2 u_p(x, t)}{\partial^2 t} \right\} \cdot [u(x - x_1) - u(x - x_2)] \quad (6)$$

The terms including spatial derivatives are related to stiffness, and the term including the temporal derivative is related to inertial forces. Here, forces proportional to the zero ($\alpha_0$ and $\beta_0$), first ($\alpha_1$) and second ($\alpha_2$) order spatial derivatives of displacements are represented. These terms incorporate the spring and bending moment produced by the patch 58. This embodiment allows a distributed force to be applied to the beam 30 to induce vibration confinement. A distributed inertial force, arising from the mass of the patch, is also present. For selecting a patch 58 for use in this embodiment, the user may select the material properties, geometric shape, dimensions, and location of the confining patch as design variables. It will be appreciated that a distributed force may be applied by other elements including, for example, a portion of the beam which is thicker than the rest of the beam between positions x8 and x9. Other patch-type devices include ribs running in the direction of the length of the structure, where the thickness of the rib is large compared to its width in a direction across the structure.

Another approach to applying vibrational confinement in a distributed manner is illustrated in FIG. 3I, where a notch 60 is provided in the beam 30 so as to separate the left and right substructures 30a and 30b. The notch extends between positions x10 and x11. The coupling of vibrational energy between the left and right substructures 30a and 30b depends not only on changes in geometric shape or dimensions of the notch 60, but may also depend on the number of notches provided in the region where vibration confinement is applied. This behavior is analogous to that where a confining patch is used, in that distributed stiffness and inertial effects are present.

Figure 4A:
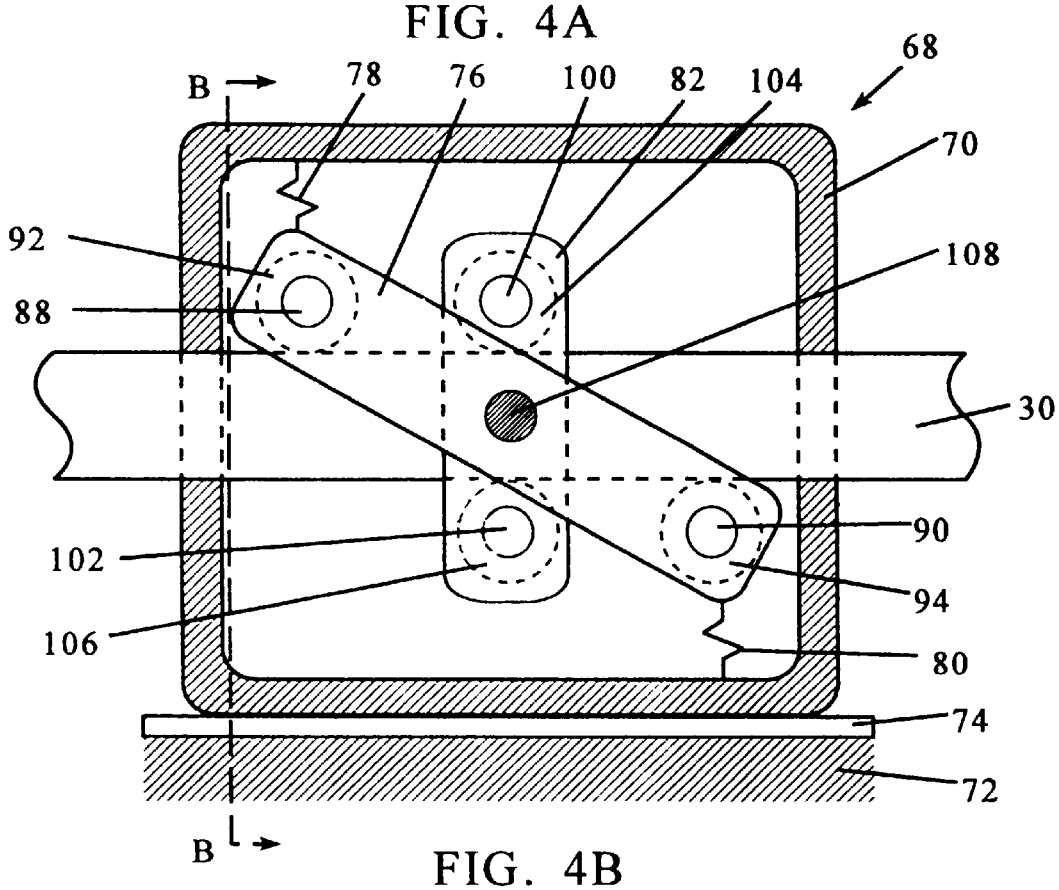
FIGS. 4A and 4B illustrate an embodiment of a vibration confinement device for a beam.
Figure 4B:
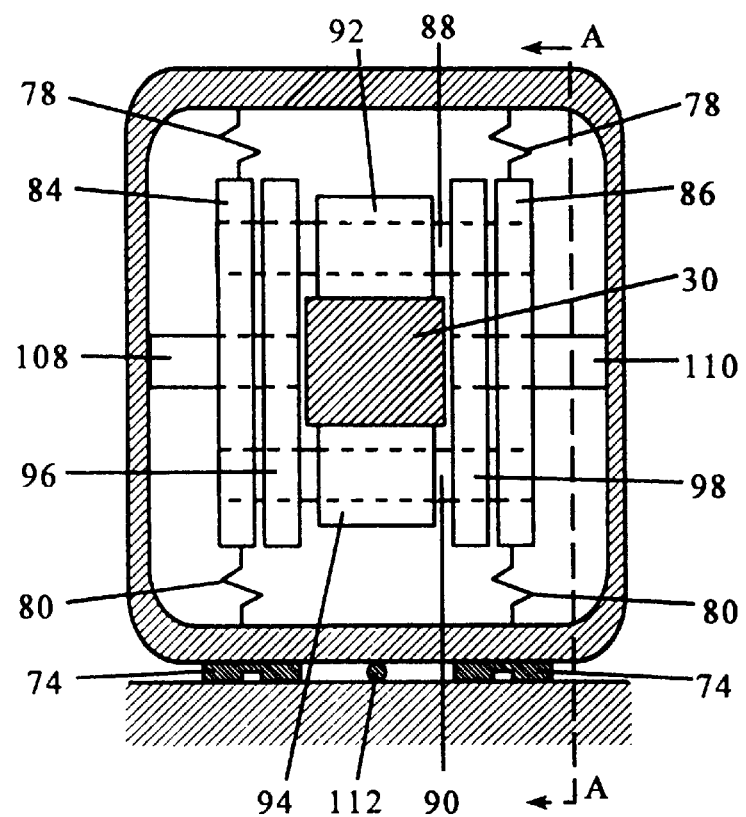

Another embodiment of a vibration confinement device is illustrated in FIGS. 4A and 4B. The vibration confinement device 68 includes a housing 70 which, in this embodiment, is rigidly attached to a ground plate 72 via rails 74. A first clamping piece 76 is attached at one end to a spring 78 which is mounted on the housing 70. A second spring 80 is mounted at the other end of the first clamping piece 76 and is also attached to the housing 70. A second clamping piece 82 is clamped more or less in a perpendicular manner across the beam 30. The first clamping piece 76 includes left and right first clamping pieces 84 and 86. Two bars 88 and 90 extend between the left and right first clamping pieces 84 and 86. Rollers 92 and 94 are respectively located on the bars 88 and 90 so as to contact the upper and lower surfaces of the beam 30, respectively.

Likewise, the second clamping piece 82 includes right and left second clamping pieces 96 and 98, connected by bars 100 and 102. Rollers 104 and 106 are located on bars 100 and 102, respectively, and contact the upper and lower surfaces of the beam 30. The left first clamping piece 84 and the left second clamping piece 96 are connected by a bolt 108. Also, the right first clamping piece 86 and the right second clamping piece 98 are connected by a bolt 110. The first clamping pieces 84 and 86 are free to rotate on bolts 108 and 110 respectively. The second clamping pieces 96 and 98 are rigidly attached to respective bolts 108 and 110 to provide translational stiffness.

Forces are applied to the beam 30 where the rollers 92, 94, 104, and 106 contact the beam 30. Since the springs 78 and 80 and rollers 92 and 94 are located at different positions along the beam 30, a bending moment (torsional force) is applied to the beam 30. Thus, translational and torsional forces are both applied to the beam 30 in this embodiment. The housing 70 may be moved along the rails by, for example, a screw 112 so that the position on the beam 30 where the vibration confinement forces are applied may be adjusted.

In a variation of the embodiment illustrated in FIGS. 4A and 4B, the bolts 108 and 110 may be rigidly attached to the beam 30, thus providing torsional force in addition to the translational force. In this case, the use of the springs 78 and 80 may be avoided.

Figure 5:
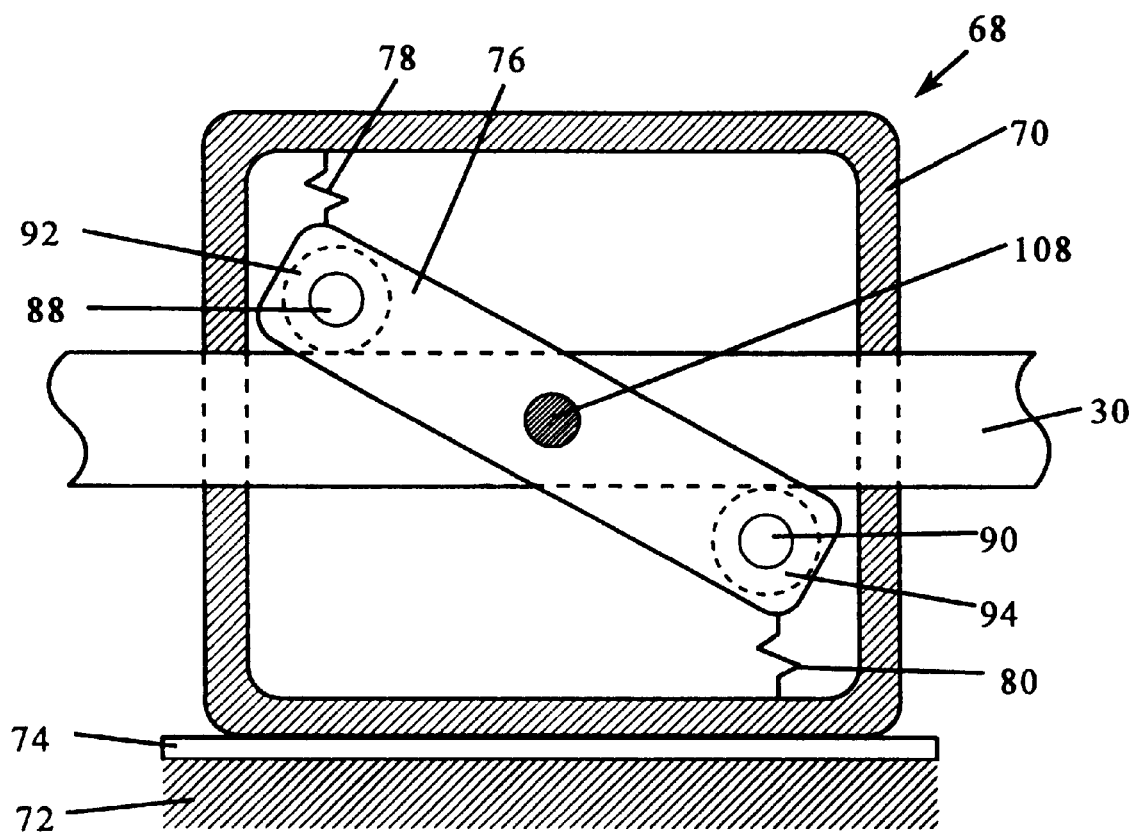
FIG. 5 illustrates another embodiment of a vibration confinement device for a beam.

Another embodiment of the vibration confinement device 68 is illustrated in FIG. 5. In this embodiment, restoring forces are applied by the springs 78 and 80 to the beam 30 at 2 points offset from one another along the axis of the beam 30, to produce an effective torsional stiffness. The bolt 108 and the bolt on the other side (hidden in drawing, but similar to bolt 110 in FIG. 4B) provide translational stiffness. The major difference between this embodiment and the embodiment illustrated in FIG. 4A is that there is no second clamping piece 82. This embodiment employs a first clamping piece 76, having left and right sides 84 and 86 on respective sides of the beam 30, the two sides 84 and 86 being connected by bars 88 and 90. Rollers 92 and 94 disposed on the bars allow the vibration confinement device 68 to be translated along the rails 74 relative to the beam 30 so as to move the locations at which vibration confinement forces are applied.

Figure 6:
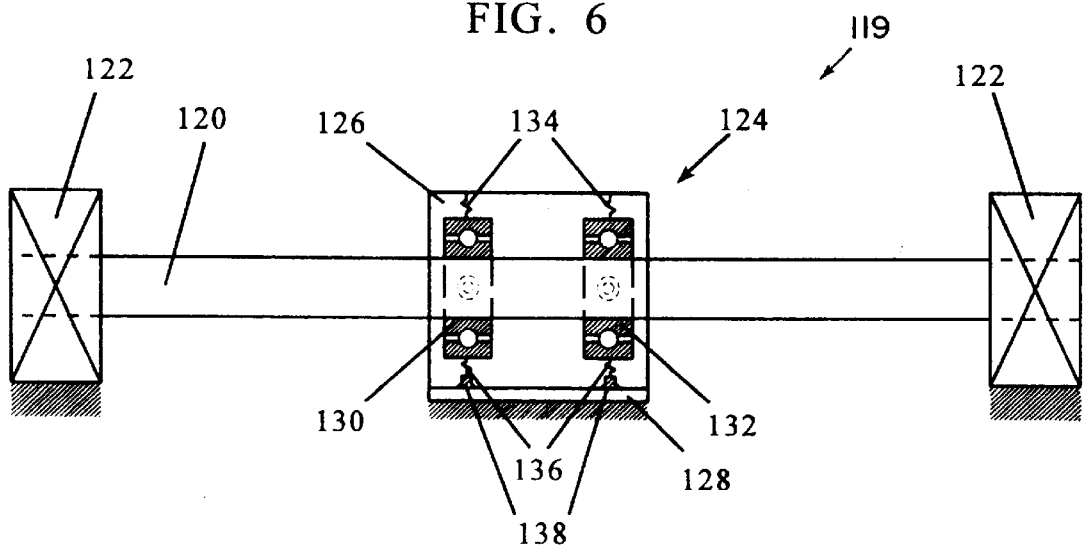
FIG. 6 illustrates an embodiment of a vibration confinement device for a rotating shaft.

We now consider the application of vibration control by confinement "VCC" to other types of structures. FIG. 6 illustrates an embodiment of the present invention for controlling vibration in a structure 119 having a rotating shaft 120. The shaft 120 is supported at each end by a bearing 122. It is desired to control vibration of the shaft 120 in the region between the end bearings 122. The vibration confinement device 124 includes a housing 126 which is rigidly attached to a separate support 128. The housing 126 contains two ball (or roller) bearings 130 and 132. Each of the roller bearings 130 and 132 is independently supported within the housing 126 by a pair of springs 134 and 136. Some or all of the springs may be adjustable so as to provide adjustment to the effective translational and torsional forces applied to the shaft 120. For example, the lower springs 136 may be adjusted using adjusting screws 138. For example, increasing tension on both adjustable springs 136 results in an effective translational force applied to the rotating shaft 120. Additionally, if the tensions applied by the adjustable springs 136 are different, then a bending moment is applied to the rotating shaft 120, which applies an effective torsional force.

This embodiment controls shaft vibrations which are in the plane of the drawing. It will be appreciated that a second orthogonal set of springs may be added to provide vibration control for vibrations out of the plane of the drawing. Additionally, the housing 126 may be mounted so as to be translatable along the axis of the rotating shaft 120 so as to permit selection of the portion of the rotating shaft where vibration confinement forces are to be applied.

The methods of applying vibration control forces to a beam type structure, as discussed above with reference to FIGS. 3–5, are applicable also to other mechanical structural types such as plate-type elements and shell-type elements. A plate type element 150 is illustrated in structure 149 in FIG. 7A, mounted on a box-shaped frame 152. In this embodiment, the edge of the plate 150 is securely attached to the frame 152 around its perimeter, for example via welding, soldering, bolting, riveting, or other similar attaching method. A rib 154 is rigidly attached to the upper surface of the plate 150, and extends completely across the width of the plate 150. The rib 154 is attached by welding, soldering, bolting, riveting, or other equivalent attaching method. The rib 154 serves to provide vibration control and to confine vibrations originating in the right portion of the plate 150a to that portion. The transfer of vibrational energy originating in the right portion 150a to the left portion 150a is minimized.

Figures 7A, 8A:
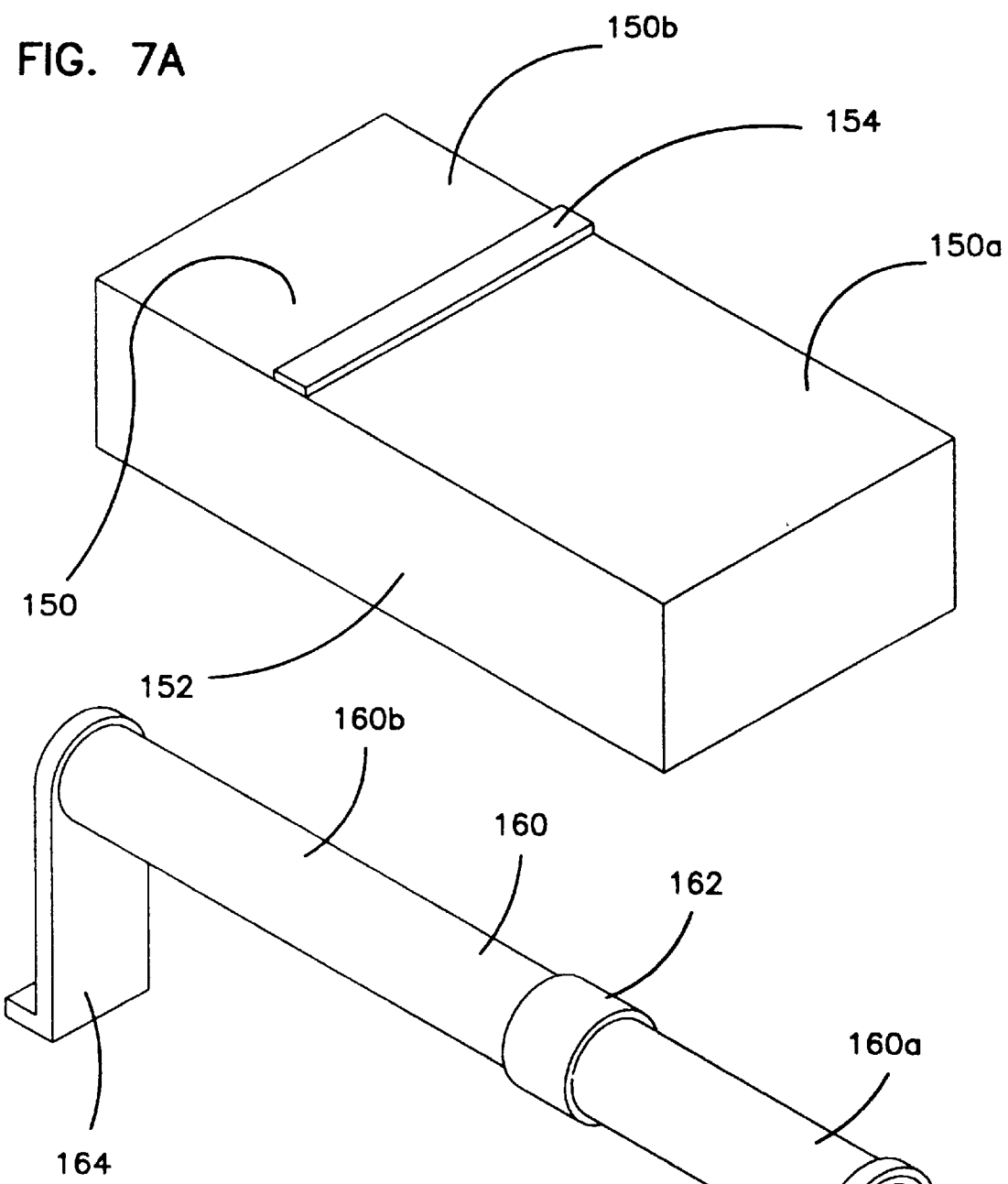
FIG. 7A illustrates a vibration confinement device on a plate.
FIG. 8A illustrates a vibration confinement device on a shell structure.
Figure 7B:
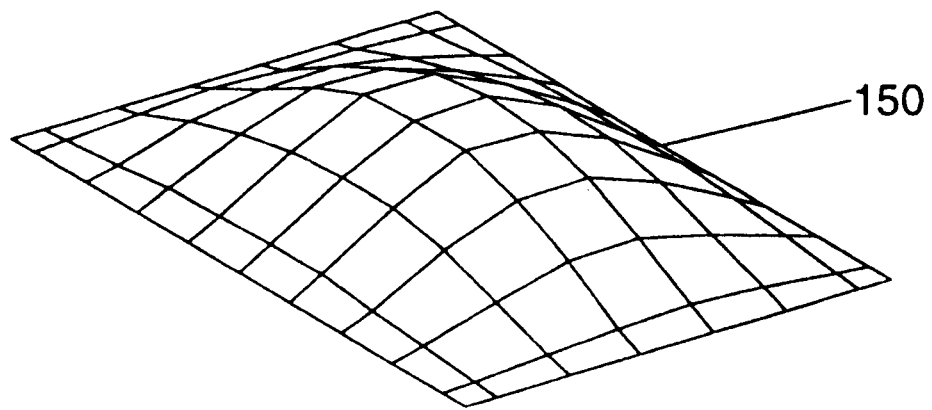
FIGS. 7B and 7C illustrate vibration response of a plate without and with vibration confinement respectively.
Figure 7C:
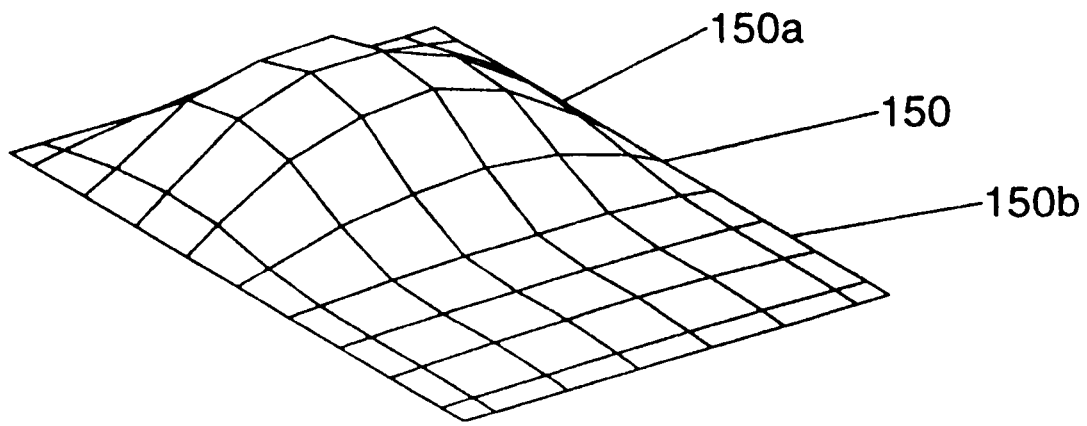

FIGS. 7B and 7C illustrate the effectiveness of controlling vibrational energy using the approach illustrated in FIG. 7A. FIG. 7B illustrates a vibration mode obtained from experimentally measuring the response of the plate 150 before application of the rib 154, thus allowing vibration to take place over the whole plate 150. Vibration was initiated by applying an impact force to a point on the left side of the plate 150b. The measurements show that vibration extended throughout the whole plate 150, even though the vibration was initiated locally in the left portion 150b. FIG. 7C illustrates the mode shape obtained from measuring the vibration response of the plate 150 after application of the rib 154. The rib 154 effectively prevents vibrational energy from being transmitted into the right portion 150a of the plate, and thus the vibration is successfully confined to the left portion 150b. Note that in FIGS. 7B and 7C, the scale perpendicular to the plate 150 has been amplified relative to the other dimensions in order to illustrate vibration. The results shown in FIGS. 7B and 7C were obtained experimentally by measuring the vibration response for each point on the surface of the plate 150 corresponding to the intersection of the lines shown in the figures.

The rib 154 is analogous to the patch stiffener 58 illustrated in FIG. 3H. It will be appreciated that other methods of vibration confinement may be applied to a plate type structure. For example, confinement forces may be applied to the plate at a number of discrete points by a number of springs, such as coil springs, leaf springs, air-cushioned springs, magnetic springs and the other types of spring referred to hereinabove with regard to a beam. Additionally, distributed confinement forces may be applied to the plate using a two dimensional patch. A two dimensional patch may include a number of ribs arranged in a two dimensional pattern on the plate.

FIG. 8A illustrates the application of vibration confinement to a shell-type structure 159, in this case a hollow cylinder 160. Here the vibration confinement is provided by a collar 162 tightly fitting around the outside of the cylinder 160. In an experimental demonstration using this configuration, the whole cylinder 160 was fabricated from steel, and the collar 162 was also fabricated from steel. A tight friction fit between the collar 162 and the cylinder 160 was achieved by heating the collar 162 before positioning it on the cylinder 160 so as to produce a right cylinder portion 160a and a left cylinder portion 160b.

The collar 162 is analogous to the rib 154 and the elastic patch stiffener 58. Vibration confinement may be applied to a shell type structure using other methods analogous to those illustrated in FIGS. 3 to 5. For example, confinement forces may be applied to a shell structure at a number of discrete points by a number of springs, such as coil springs, leaf springs, air-cushioned springs, magnetic springs and the other types of spring referred to hereinabove with regard to a beam. Alternatively, distributed confinement forces may be applied to the shell using a patch. The patch may include a number of ribs.

Figure 8B:
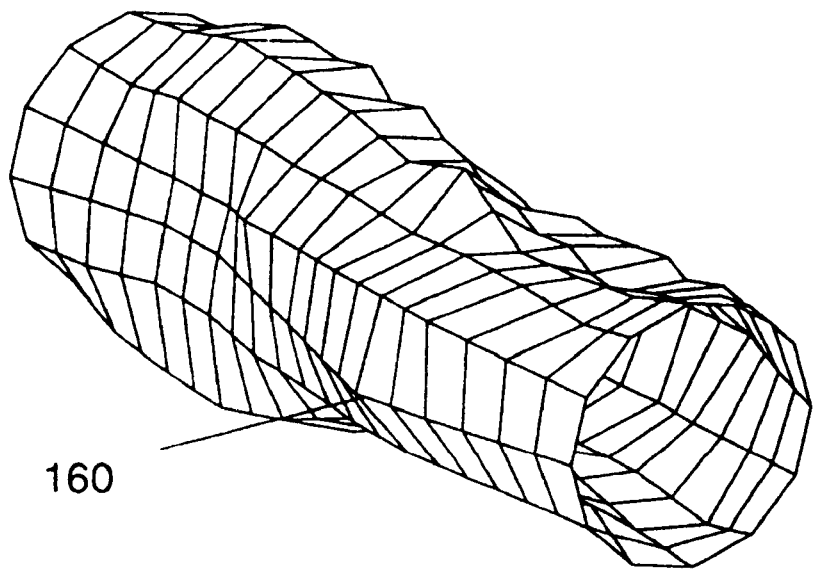
FIGS. 8B and 8C illustrate vibration response of the shell structure without and with vibration confinement, respectively.
Figure 8C:
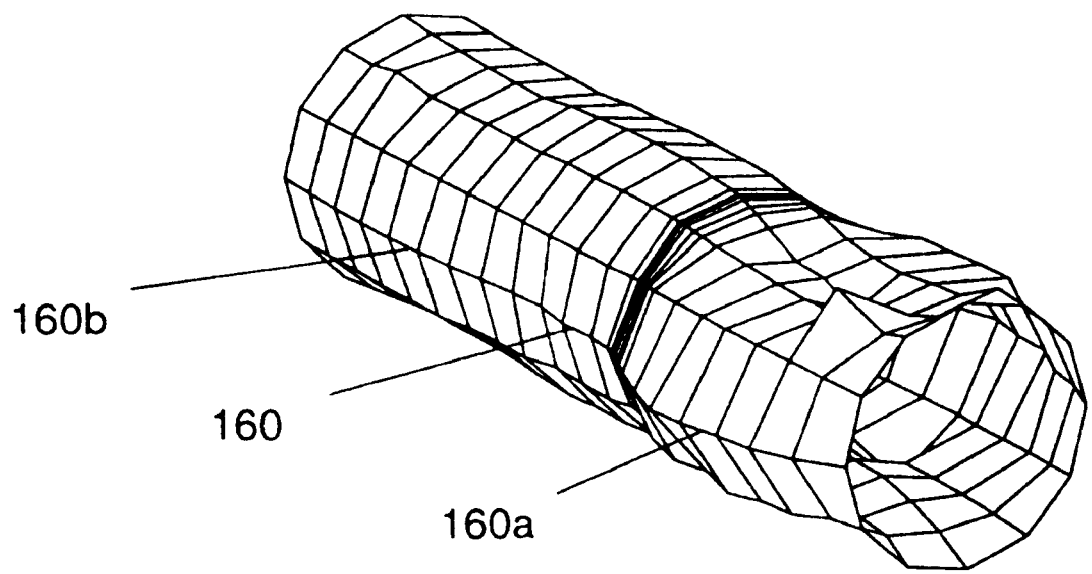

FIG. 8B illustrates one vibration mode of the cylinder 160 before application of the collar 162. FIG. 8C illustrates a vibration mode after application of the collar 162. Before application of the collar 162, the vibrational mode extends throughout the length of the cylinder 160. After the collar 162 is positioned, minimal vibrational energy originating in the right cylinder portion 160a passes to the left cylinder portions 160b, and therefore the collar effectively confines vibration to the right cylinder portion 160a.

The modal characteristics of a structure, such as the natural frequencies, mode shapes, and damping properties, may be controlled by VCC. One may be able to control which modes participate significantly in the total vibration response of the system by controlling regions of confinement and suppression, the severity of confinement, and the natural frequencies of the structure. The severity of confinement is defined as the ratio of the maximum displacement within the confinement region to the maximum displacement outside the confinement region.

In illustration, consider the example of a structure including a pinned-pinned beam, of the sort illustrated in FIG. 2E, having a blade-type device to provide vibration confinement. Here, the effective translational and torsional stiffnesses are controlled by the geometric and material properties of the blade. Another confinement-controlling parameter is the position of the blade along the length of the beam. These three parameters are responsible for establishing the confinement region, the severity of confinement, and the natural frequencies of the structure.

Figure 11:
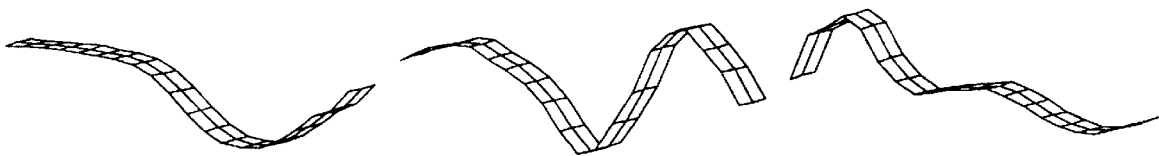
FIG. 11 illustrates confined vibration modes of a beam structure.

Experimentally measured natural frequencies and mode shapes from such a structure having vibration confinement are illustrated in FIG. 11. The first two modes, having frequencies at 31.3 Hz and 97.2 Hz, respectively, have their vibration energy confined to the right end of the beam 10b. The third mode, having a natural frequency at 116.5 Hz, is confined to the left side of the beam 10a. The vibration response depends on both the position and frequency of the excitation. If the excitation is at a frequency below 100 Hz, then the first two modes may be strongly excited, depending on the position of the excitation. The third mode is not significantly excited, irrespective of the position of the excitation, since the excitation energy is not provided at the correct frequency.

Figure 12:
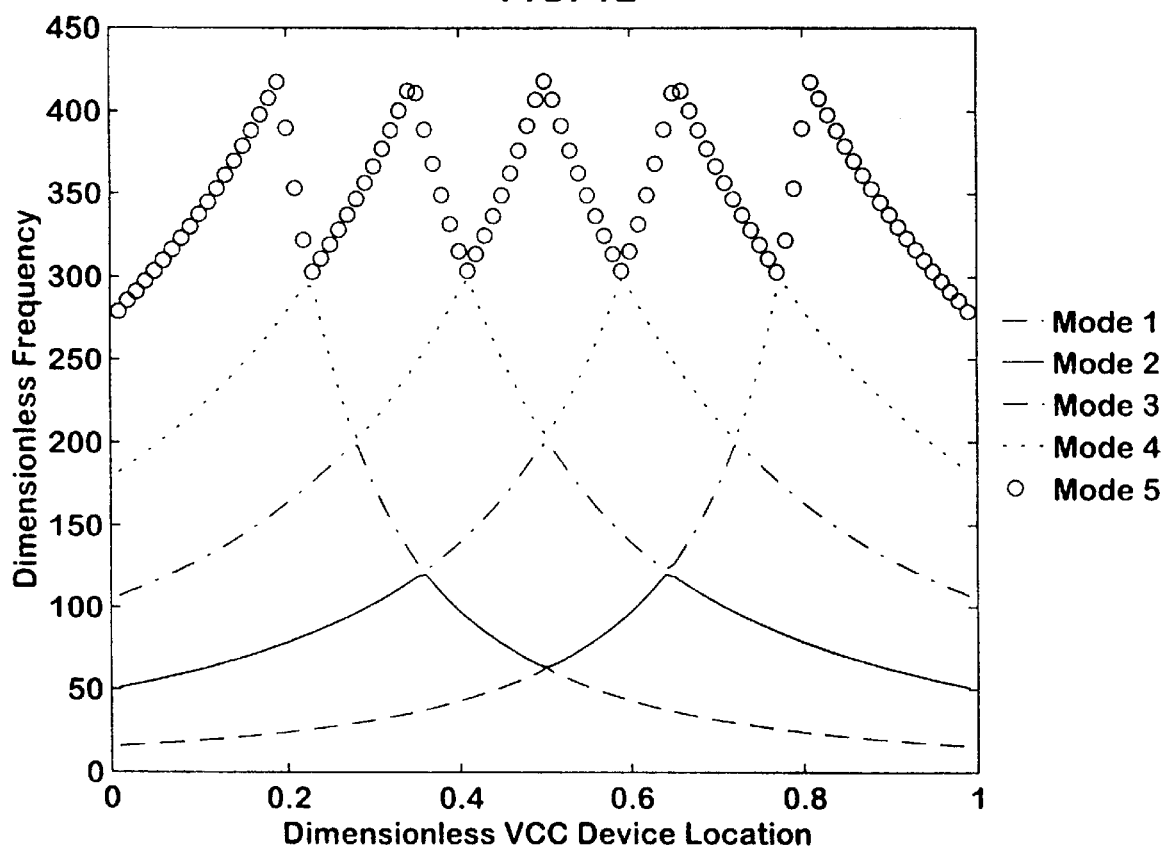
FIG. 12 illustrates relationships between confined vibration mode frequencies and position of confinement.

The natural frequencies of the same structure may also be tailored to meet the specifications of a particular application. To methodically set design parameters needed to tailor the VCC device, design curves showing the relationship between the natural frequencies and the design parameters may be used, and example of which is illustrated in FIG. 12.

One of the parameters affecting the natural frequencies of the structure is the position of the vibration confinement device. The design curve illustrates the dimensionless frequency for the first five vibration modes of a beam, pinned at each end as shown in FIG. 1, as a function of dimensionless position along the beam. To use the curve, a dimensionless position on the beam is selected, for example at 0.4. Consequently, the first five modes are determined to have respective dimensionless frequencies of approximately 43, 97, 139, 291 and 315 by reading off the y-axis values of curve corresponding to the x-axis position 0.4. This type of curve may be used to set proper parameter values for tuning the natural frequencies of the structure.

Figure 9:
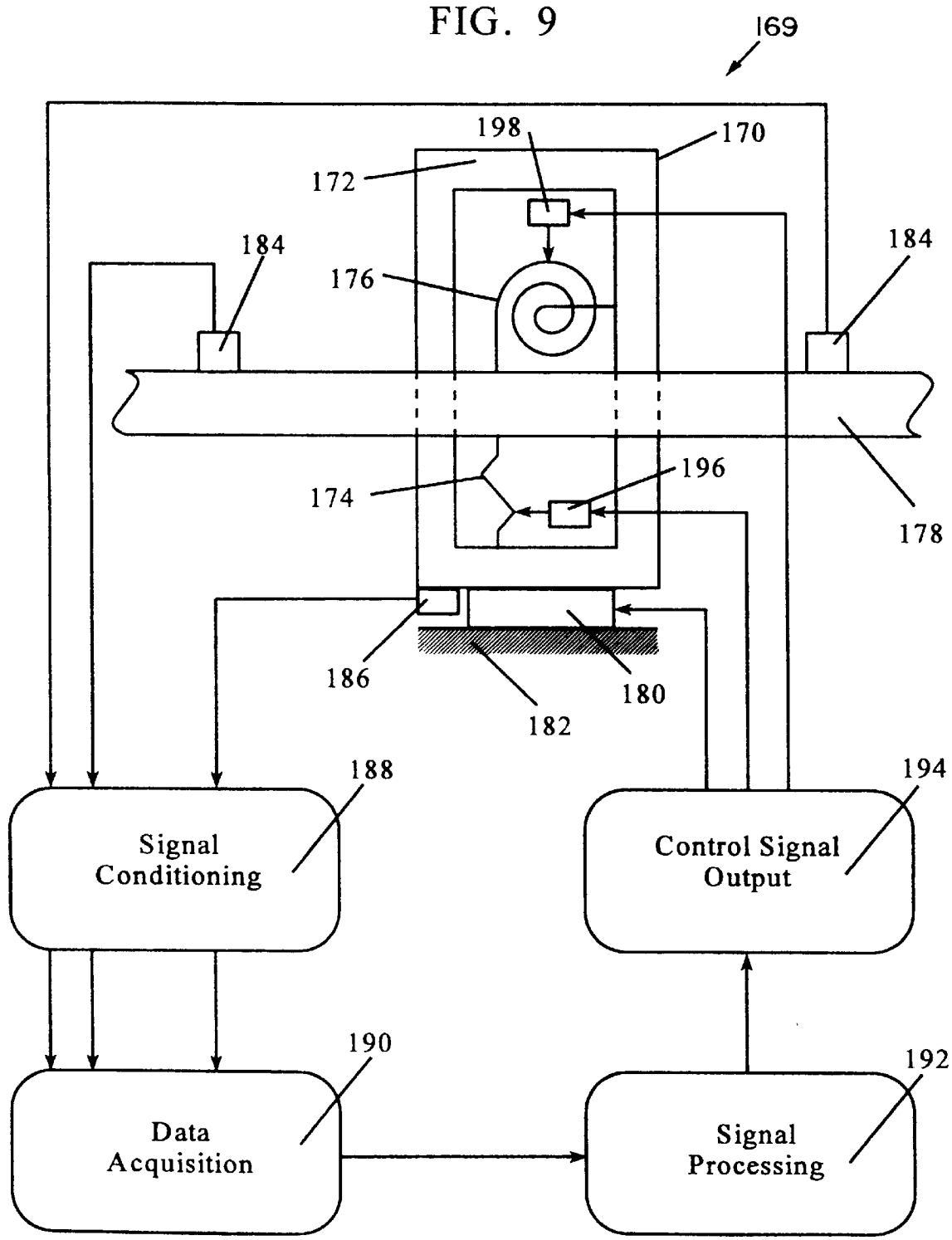
FIG. 9 illustrates an embodiment of the present invention for active vibration control.

FIG. 9 illustrates how vibration confinement may be controlled actively, semi-actively, or in a hybrid manner. In active VCC, the effective translational and torsional forces are actively applied by the vibrational confinement device, i.e. under active control in response to a sensed vibration signal, as is described further hereinbelow. In semi-active VCC, the vibration confinement device passively applies effective translational and torsional forces up to a certain threshold of, for example, vibration energy or amplitude. Once this threshold has been reached, the vibration confinement device then applies the effective translational and torsional forces actively. In hybrid VCC, both passive and active effective translational and torsional forces are applied continuously.

In FIG. 9 a structure 169 having a controllable vibration confinement device 170 includes a housing 172, a controllable effective translational spring 174 and a controllable effective torsional spring 176. In addition, the vibration confinement device 170 is translatable along the width of the beam 178 using a translator 180 so as to permit a variation in the position where vibration confinement is applied. Here the translator 180 is illustrated as being fixed to a fixed support 182 so as to permit translation of the vibration confinement device along the axis of the beam 178 relative to the fixed support 182.

Vibration sensors 184 are positioned on the beam 178. An additional vibration sensor 186 may be located on the vibration confinement device 170. The vibration sensors may be any sensor that can detect vibration including, but not restricted to, strain gauges, accelerometers and other devices based on resistive and capacitive effects. Other methods, including optical deflection and interferometric methods may be also used to measure the vibration. Signals from the vibration sensors 184 and 186 are transmitted to a signal conditioning unit 188 from which they are subsequently transmitted to a data acquisition unit 190.

Data received by the data acquisition unit 190 are processed in the signal processing unit 192 to compute the vibration response of the beam 178 and the state of the vibration control unit 170. The signals are processed in the signal processor 192 to produce an active response signal in accordance with the current behavior of the beam 178. The active response signal is transmitted to the control signal output 194 which translates the active response signal into control signals that are passed to control the system actuators. The first actuator is the translator 180 which controls the position of the vibration confinement device 170 on the beam 178. The second actuator 196 controls the effective translational spring constant, and the third actuator 198 controls the effective torsional spring constant.

The actuators 180, 196 and 198 may include combinations of adjustable pressure dependent, air filled springs; temperature dependent, variable stiffness SMA springs, or variable geometry "smart" material actuators which induce stiffness or position changes to the structure to which they are applied.

Having vibration sensors 184 placed on either side of the vibration confinement device 170 allows the signal processing unit 192 to determine the relative magnitude of vibration on either side of the vibration confinement device 170 which may be used as a measure of the effectiveness of vibration confinement. Adjusting the position and the effective translational and torsional spring constants of the vibration confinement device 170 may produce variations in the ratio of the vibration response on either side of the confinement device 170, thus allowing the signal processing unit 192 to optimize vibration confinement. Only one vibration sensor 184 may be used to measure the magnitude of the vibration in the region from which vibration is to be removed using VCC.

The sensors 184 may measure one or a combination of several vibration response dynamic variables, including displacement, velocity, acceleration, and strain. The sensors 184 may be contacting, i.e. attached to the beam 178, or noncontacting, i.e. mounted independent of the beam 178. The vibration confinement device sensor 186 may monitor any parameter necessary to reveal the state of the confinement device 170 depending upon the embodiment of the vibration confinement device, such parameters may include position, strain, force, pressure, tension, and temperature.

Stiffness control may be provided using one or a combination of adjustable pressure dependent, air filled springs; temperature dependent, variable stiffness SMA springs; or variable geometry "smart" material actuators including piezoelectric devices, electrostrictive or magnetostrictive devices, rheological fluids and magnetological fluids. Direct control over applied forces or moments may be provided by known electrical, electromechanical or magnetic force actuators. Examples of such actuator include reaction force mass actuators, electromechanical actuators, piezoelectric force and strain actuators, magnetoelectric actuators, shape memory allow actuators, Theological and magnetological fluid-filled clutches, servo motors and stepper motors. The position of the vibration confinement device may be adjusted using electronically controlled motors, screw shafts, linear air or roller bearings, or gears. None of these lists are intended to be exhaustive, and are provided only for illustration.

It will be understood that where the vibration confinement device 170 includes, for example, an array of springs, each spring directly producing a respective translational force, then each such spring may be separately actuated. The effective torsional force of the device 170 may be controlled by controlling the relationships among the multiple spring constants. Similarly, where the confinement device 170 employs an array of torsion springs, control of the relationships among the multiple torsion spring constants results in control of the effective torsional spring constant of the device 170.

Figure 10:
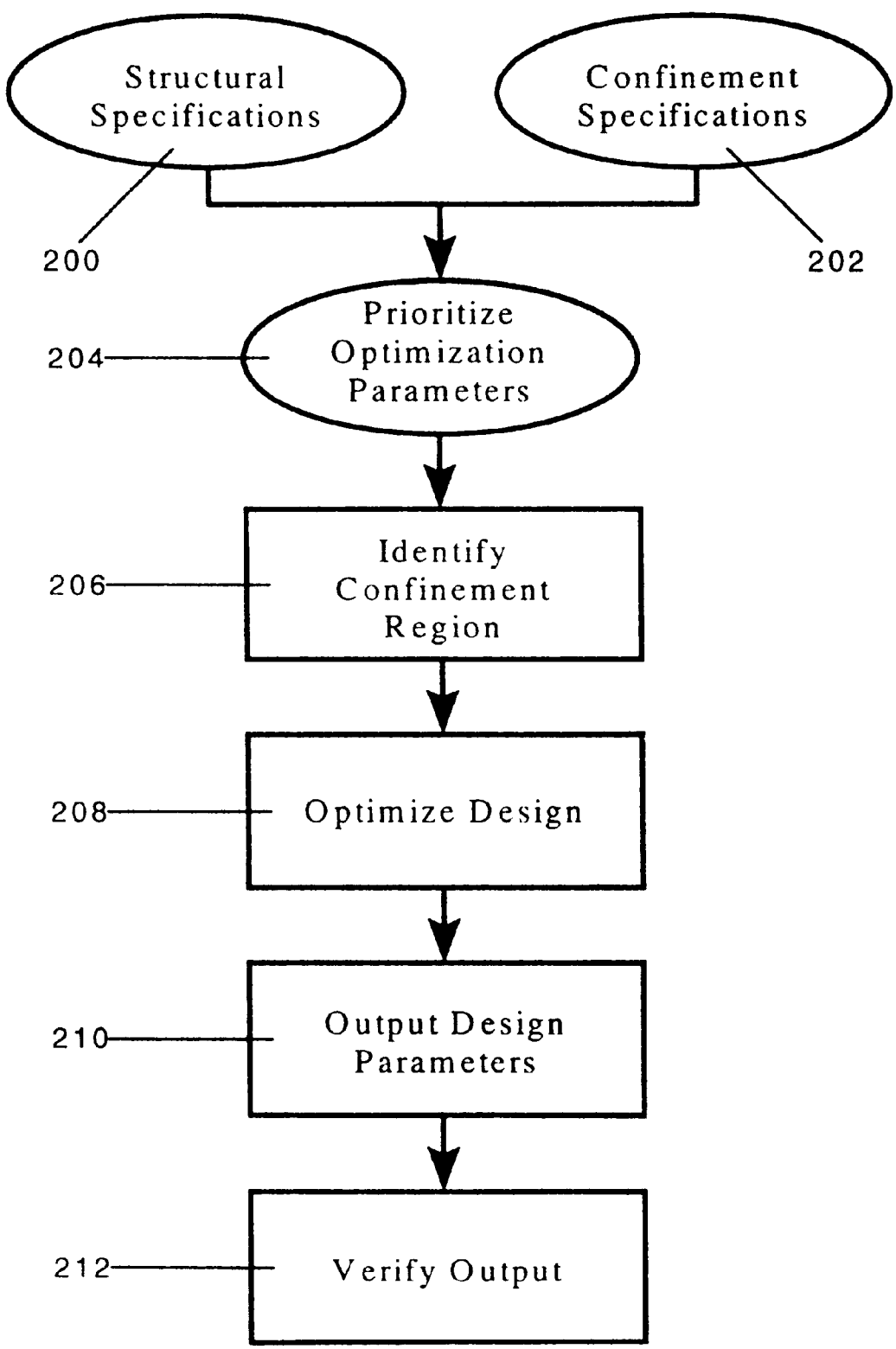
FIG. 10 illustrates a method of optimizing vibration confinement in a structure.

FIG. 10 illustrates the steps taken to optimize the structural response of a system based on VCC. This optimization process is different from conventional optimization routines because it requires specific input information relating to vibration confinement and produces an output with optimized vibration confinement parameters. No currently available process considers the optimization of design parameters to result in confined vibrational response or vibrational modes. The output may, for example, identify a suitable region for confinement to achieve the desired performance and confinement objectives. This process may be utilized both for optimizing design parameters based on VCC alone or in conjunction with other performance criteria based on VCC.

In step 200, system structural data are input into the optimization process. This input may include structural geometric and material properties of the structure, used in characterizing the structure for analysis. It may also include design parameters and allowable variation in design parameters to ensure that the optimized structure will meet criteria for geometric and material constraints after the structural changes necessary to induce vibration confinement have been introduced. The system structural data may also include system performance specifications to ensure that the optimized structure will meet operational and functional specifications after the structural changes necessary to induce vibration confinement are introduced. These specifications may be limits on displacements, stresses, fatigue and the like. It may also include vibration characteristic data, such as natural frequencies, mode shapes, damping properties or even a specified total structural response, where the vibration characteristics are specified to meet function or performance requirements. The input may also include other factors to optimize, for example, for cost, weight, manufacturability, implementation and the like.

The confinement specifications, unique to the VCC process, are input into the optimization process in step 202. The confinement specifications may be used to select the optimum confinement region, to select the optimum suppression region, to specify the severity of confinement, to determine a most favorable means for inducing confinement, or to optimize the design of a confinement device. The confinement specifications include the confinement objectives, the confinement requirements, the confinement configuration and the confinement method, described below.

If the confinement objectives (desired regions of confinement of suppression, modal confinement or total response confinement, severity, and means for inducing confinement) are known based on the design and operational specifications, they may be used as input to select optimal designs while meeting the vibration performance specifications. For example, an output objective may be to determine the most appropriate way to induce confinement or to specify the optimum design of the confinement device.

Confinement objectives may include vibration reduction, vibration isolation, vibration amplification, or modification of the system vibration-related characteristics. The distinction between these types of objectives may be illustrated by example. For instance, the vibration in a system may be reduced in order to protect critical components or spatial regions of the system. Uncontrolled vibration in these components may result in degraded system performance, unsafe system operating conditions, increased component failure, or shortened component or system life expectancy. Another confinement objective may be to amplify the vibration response in a spatial region of the system. This amplification may enhance the performance of some systems. Confinement of vibration energy may enhance the effectiveness of process machinery which rely on the effective transmission of energy to external objects. Examples of such machinery include vibrating mixers, separators, cleaners, grinders, and finishers. Other examples may include vibration transport or processing machines, vibrating elevators, crushers, and motors. Equipment used for the surface hardening may also benefit from confine vibration. Confinement of vibration energy may also enhance the performance of vibration damping elements, vibration sensing instruments, and acoustic radiation in transducers.

Modifications to the vibration-related characteristics of a system may also be beneficial independent of the benefit of reduction or amplification of vibration. Altering the natural frequencies or mode shapes of a system may extend its usefulness. For instance, raising the natural frequencies of a rotating machine may extend the practical range of operating speeds. Also, modified impedance of a system may allow for better energy transmission or absorption.

If the confinement objectives are not pre-determined, confinement regions may be optimized based on the initial non-confined modes of a system, as determined by an optimization routine run at an initial design stage. Further design, such as the placement of critical components on the confined structure, then takes place. An additional optimization pass may be required to finalize the design.

The confinement requirements to be considered include the specified vibration parameters such as natural frequencies, modal displacements or participation, modal damping, and total vibration response in the frequency or time domain.

The confinement configuration includes variables such as the region for confinement (which may be a process output, if not specified as an input) and the severity of confinement.

The confinement method describes the apparatus and associated initial design variables used to induce confinement. For instance, in the case of the plate with a rib stiffener (described earlier with respect to FIG. 7A), the initial values for the geometric shape, geometric dimensions, location, and material properties may be the design variables.

The optimization parameters are selected and prioritized in step 204. The optimization parameters may be weighted to place emphasis on specific aspects of the system design which may affect the outcome of the designed system through its performance, manufacturability, or cost. The optimization parameters may also place higher value on specific aspects of each of the above mentioned outcomes. Examples for each outcome may include the severity of confinement, the placement of structural or damping elements, and the amount or weight of the system components.

The confinement region is selected in step 206, based on the input data and optimization priorities.

The design of VCC is optimized in step 208 based on the input data and any results from step 206. Standard optimization methods may be used in this stage to optimize the system design.

The design parameters for the optimized system are output in step 210.

Additional analysis of the optimized system may take place in step 212 in order to verify that all design and operational specifications have been met.

The method described above may produce more than one set of output parameters that meet the input specifications. Other design considerations, not included in the method, may then be used to select one of the sets of output parameters. For example, the optimization procedure may produce three sets of output parameters for the system, each corresponding to a different approaches to confining the vibration. A subsequent consideration of the space available around the system may show that there is not sufficient space to implement one or more of the suggested approaches, and that only one of the approaches is easily implemented.

While various examples were provided above, the present invention is not limited to the specifics of the examples. For instance, vibration control was discussed in terms of a beam, a rotating shaft, a plate and a cylindrical shell. Vibration control by confinement may also be applied to other types of structural element including, but limited to, other shapes of shell structure, irregularly shaped plates and partial shell structures. Additionally, although each structure illustrated has only shown one region of vibration confinement, it will be appreciated that a structure may also be provided with two or more vibration confinement regions.

As noted above, the present invention is applicable to controlling vibration in different types of mechanical structures. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A method for controlling vibrational energy in a structure (11) having a vibrating member (10) using a vibration confinement device (16, 22, 24), the vibrating member having boundaries (20) imposing boundary conditions on the vibrating member, the vibrating member vibrating relative to the boundaries, the method comprising:

selecting a vibration confinement region (10a) in the vibrating member relative to the boundaries, determining an effective torsional stiffness and an effective translational stiffniess for the vibration confinement device;

determining an operating position (x3) relative to the boundaries for said vibration confinement device on the vibrating member; and positioning said vibration confinement device at said operating position, thereby confining vibrational energy to said vibration confinement region.

2. The method according to claim 1, wherein the vibration confinement device is a passive vibration confinement device.

3. The method according to claim 1, wherein the vibration confinement device is an active vibration confinement device.

4. The method according to claim 1, further comprising selecting a frequency range over which vibrational energy is confined to the vibration confinement region.

5. The method according to claim 1, further comprising selecting a specific modal behavior of the structure.

6. The method according to claim 1, further comprising adjusting at least one of the translational stiffness, the torsional stiffness and the operating position of the vibration confinement device so as to enhance confinement of vibrational energy to the vibration confinement region.

7. The method according to claim 1, wherein said vibration confinement device is an active vibration confinement device and further comprising positioning a sensor on the vibrating member to sense vibration of the member and to generate a sensor signal in response to the sensed vibration and controlling said active vibration confinement device in response to the sensor signal.

8. The method according to claim 7, further comprising generating a vibration control signal in a controller in response to the sensor signal, and transmitting the vibration control signal to said active vibration confinement device.

9. The method according to claim 7, wherein the step of controlling said active vibration confinement device comprises adjusting at least one of said position of the active vibration confinement device, said translational stiffness of the active vibration confinement device, and said torsional stiffness of the active vibration confinement device.

10. The method according to claim 7, further comprising selecting a frequency range over which vibrational energy is confined to the vibration confinement region.

11. The method according to claim 7, further comprising selecting a specific modal behavior of the structure.

12. A method for controlling vibrational energy in a structure having a vibrating member using a vibration confinement device to confine vibration energy to a preselected vibration confinement region, the method comprising:

determining an effective torsional stiffniess and an effective translational stiffness for the vibration confinement device;

determining an operating position for said vibration confinement device on the vibrating member; and positioning said vibration confinement device at said operating position, thereby confining vibrational energy to the vibration confinement region.

* * * * *